(12) United States Patent
Jones

(10) Patent No.: US 8,136,260 B1
(45) Date of Patent: Mar. 20, 2012

(54) COMBINATION ANCHOR BOLT HOLDER AND CONCRETE FORM SPACER/TIE

(76) Inventor: Paul Jones, Dixon, CA (US)

( * ) Notice: Subject to any disclaimer, the term of this patent is extended or adjusted under 35 U.S.C. 154(b) by 0 days.

(21) Appl. No.: 12/928,155

(22) Filed: Dec. 6, 2010

(51) Int. Cl.
*G01B 5/24* (2006.01)
(52) U.S. Cl. .......................................... 33/518; 33/562
(58) Field of Classification Search .................. 33/518, 33/526, 562, 613, 645
See application file for complete search history.

(56) References Cited

U.S. PATENT DOCUMENTS

| | | | |
|---|---|---|---|
| 4,117,643 A * | 10/1978 | Lamothe | 52/699 |
| 5,060,436 A * | 10/1991 | Delgado, Jr. | 52/295 |
| 5,400,997 A * | 3/1995 | Payne et al. | 52/297 |
| 6,240,697 B1 * | 6/2001 | Thompson et al. | 52/698 |
| 7,103,984 B2 * | 9/2006 | Kastberg | 33/562 |
| 7,222,464 B2 * | 5/2007 | Suehiro | 52/295 |
| 7,984,541 B1 * | 7/2011 | Davidson | 33/645 |
| 2006/0016140 A1 * | 1/2006 | Smith | 52/295 |
| 2008/0295444 A1 * | 12/2008 | Cornett, Sr. | 52/698 |
| 2010/0212250 A1 * | 8/2010 | McSherry et al. | 52/704 |
| 2011/0179748 A1 * | 7/2011 | Gee | 52/745.21 |
| 2011/0227298 A1 * | 9/2011 | Teng | 52/705 |
| 2011/0277396 A1 * | 11/2011 | Schneider | 52/698 |

* cited by examiner

*Primary Examiner* — G. Bradley Bennett
(74) *Attorney, Agent, or Firm* — William S. Bernheim

(57) ABSTRACT

The invention comprises a reusable, combination—anchor bolt holder, form board alignment and retention, and, thread protection device—for holding an anchor bolt in a secure vertical alignment at an exact depth in the form for either a 2×4 or 2×6 sill plate with the threads fully protected from fouling by cement; and, allowing of early hand float finishing around the bolt thread area that projects above the top of the stem wall.

13 Claims, 5 Drawing Sheets

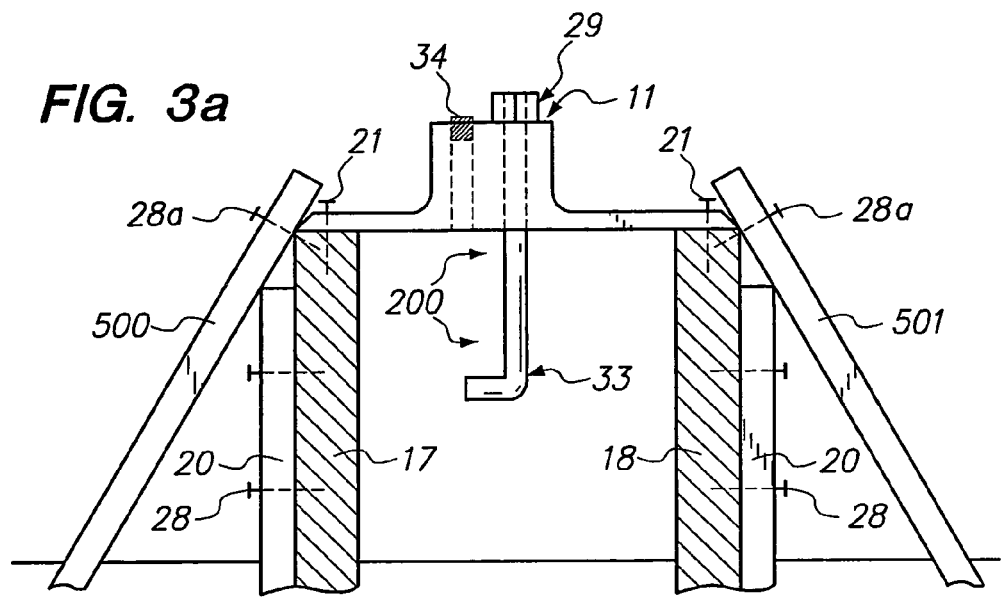
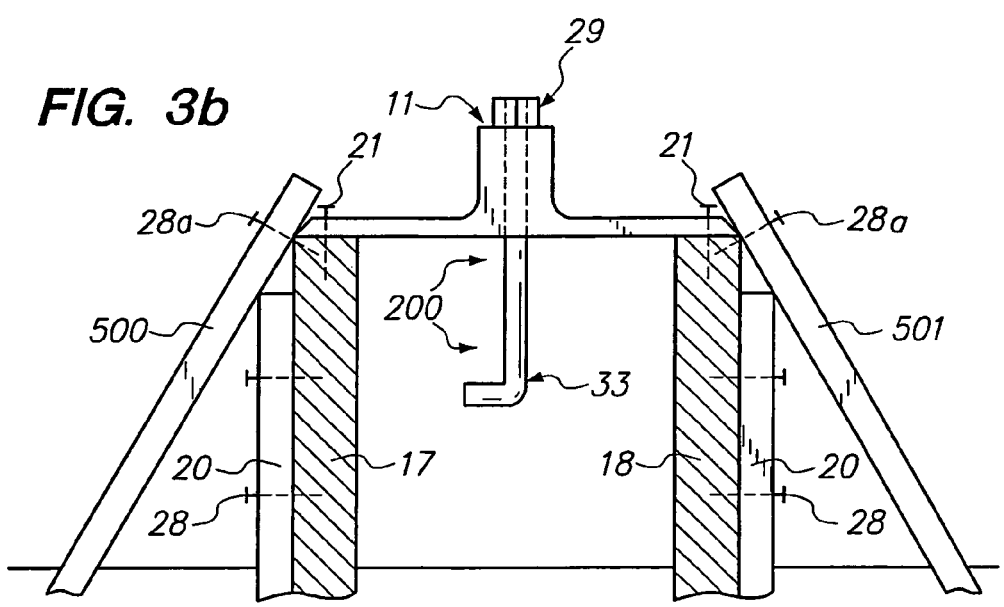

COMBINATION ANCHOR BOLT HOLDER AND CONCRETE FORM SPACER/TIE

BACKGROUND OF THE INVENTION

1. Field of the Invention

The invention relates to a template for setting anchor bolts in concrete foundations; more particularly it relates to a reusable device that allows of a visual alignment of an internal top edge of each of a pair of form boards at an appropriate distance of internal separation and also provides an ability for a tieing into place of the tops of the form boards while simultaneously providing a support for holding an anchor bolt in an appropriate position within the stem wall form for a passage of an appropriate length of a threaded superior end of the anchor bolt in an upwards projection above a top surface of the stem wall and as well as through a hole in either a nominal 2.times.4 or a nominal 2.times.6 sill plate as well as a passage through and above an anchor bolt washer and nut, and, does so with a threaded end of the anchor bolt being afforded a protection against being fouled with cement and with a nonthreaded base end of an anchor bolt to be held in a vertically true position and at an appropriate depth within the stem wall.

2. Description of the Relevant Prior Art

It is well known to pour concrete between a set of wooden form boards that retain a concrete material used to form a foundation for a building or to form a support foundation for a wall supporting roof elements attached to a side wall of a building. The wooden forms are used to retain the concrete while it reaches a cured state. Whether the forms are used with a lower section set down within a trench in the ground as is common with building foundations, or used at a ground level with a series of below ground weighted anchoring sections for walls supporting roof elements attached to a side wall of a building, etc., a series of wooden spacer bars that span across and are nailed into a pair of top surfaces of a pair of opposed form boards have conventionally been used to hold the tops of the form boards at a selected separation while the concrete is poured into the form during a curing process of the concrete.

In a trenched situation, a bottom width separation of the form boards is secured by a series of internal spacer boards placed in a situation at the bottoms of the form boards; in an above grade situation a series of upright stakes driven into the ground and nailed to a side aspect of the form boards serve to hold the form boards in a basically vertical alignment. The top edges in either instance require an additional support in order to maintain a selected width across a top of the stem wall. A series of wooden cleats nailed across the top edges of the form boards have been used historically, however they often provide unsatisfactory results because a weight of the poured concrete can spread the topmost edges of the boards, distorting the spacing of the form boards and leading to a failure to maintain a proper top width of the finished stem wall; factors involved in this failure include: a cracking of the cleats that allow spread around a set of cleat anchoring nails, or, an improper nailing due to haste, or an improper measurement caused by an operator trying to simultaneously hold the forms, cleat, hammer, nails and measuring device at the proper alignment in and between themselves; in any event, the procedure is expensive in terms of materials and time since it often takes the workman a significant amount of time to achieve proper spacing at the top edges of the form boards.

A set of angulated brace stakes can be used to provide an additional support to prevent spreading of the forms. These braces will of course end with a top section projecting up and over the tops of the form boards and above the top of the stem wall so they may provide an interference with a screeding, hand float finishing and edging of a top surface of cement in a poured stem wall.

Commonly, an above earth grade form alignment has process has involved a use of a plumb line to establish a height and alignment of one side wall following which that side of the form is then set up; next, a parallel second line is set up to create a line for the opposed form wall; then a measuring tape must be used to fine tune the distance between the opposed form boards as upright side wall form support stakes are driven into place and top cleats are nailed in place; finally separate brace stakes are placed to hold the form in place; this is a labor time consuming process.

Once poured and partially set, it is usual to use a hand float or a screed board to additionally smooth the concrete surface in order to provide a relatively flat, smooth surface for the placement of a set of wooden mud sill boards that are to be anchored atop the stem wall by a series of anchor bolts, washers and nuts that project from the foundation and up through a series of predrilled holes in the mud sills; the fewer the projections above and across the forms the better because it makes the screeding and hand floating easier, faster and more effective.

Anything impeding easy access to the cement for the finishing results in increased labor cost because of an additional time spent in the finishing process; these impeding elements also increase a chance that a poorly finished top surface may cause an interference with a proper alignment and leveling of the mud sill boards.

A series of anchor bolts, also commonly known as Anchor bolts are used in the stem walls for a provision of a secure connection to a wooden sill plate to which a super imposed structural element can then be attached. Building codes commonly dictate the following: 1. a minimal width of a cement stem wall foundation; 2. a selected spacing between anchor bolts within the cement along a length of the stem wall foundation; 3. a diameter of bolt as well as a length of that bolt that must be locked within the concrete; 4. a vertical location of the bolt within and relative to an edge of the cement foundation; 5. further, a threaded section of the anchor bolt must project for an appropriate length above the foundation such that a washer and nut can be affixed to the bolt atop a sill plate or other such base structural member. When placed in accord with these dictated parameters the anchor bolts can best serve a purpose of an adequate holding of the superstructure onto the stem wall foundation element.

As well as dictating the width of the stem wall foundation, building codes also commonly dictate a width of an appropriate bottom sill plate needed for a specific wall type in both residential and commercial construction projects. An across the top width of six inches is commonly used as a conventional minimal stem wall foundation. This means that the distance between the inside aspect of the laterally placed foundation form boards must have a minimal distance of 6.inches between them in most instances. Some buildings and uses may demand a wider topped foundation, but walls requiring use of either a 2.times.4 or 2.times.6 sized sill plate conventionally rest on a six inch top width cement foundation; the term "conventional foundation" will be used to describe a cement foundation having a six inch top width in the remainder of this application.

It is common practice to utilize a template or a jig of some type to facilitate a proper placement and stabilization of a series of anchor bolts within a foundation form. Problems faced in accurately situating the anchor bolts include the following: one or more of the bolts may rotate during the concrete pouring process, displacing the base of the "j component from its ideal location, thus rendering the anchorage less stable; or the bolts may float upwards leading to a need to use additional washers to secure the sill plate; this also leads to an inadequate depth of Anchor bolt being situated within the stem wall; if due to an improper support, an anchor bolt settles too far downwards an increased difficulty is experienced in an attachment of the sill plate atop the stem wall.

In other instances, improper support of the anchor bolt within the form, the forces of the pouring and settling processes used with the cement material may tip the bolts out of the true vertical, making the placement of the sill plate over the bolts more difficult, and in some cases weakening the fixation of the anchor bolt within the cement stem wall which is some cases may be called a mud sill. Another common problem is a fouling of the threaded ends of the Anchor bolts with hardened cement material where they project upwards from the top of the stem wall; once hardened it is necessary to remove the cement from the threads in order to insure a level seating of the sill plate and to provide a secure pressure of the washer and nut down onto the top of the sill plate; failure to do so can create a series of problems in the levels of walls that reflect up into and create defects well up into the upper levels of the building.

Various devices have been developed to improve the efficiency and manner of situating the anchor bolts during the set up for and during the cement pouring process. Examples of such devices include: US Application 2006/0016140 (Smith); U.S. Pat. Nos. 7,225,589 (Smith); 4,261,544 (Addison); 7,487,597 (Diaz); 5,060,436 (Delgado Jr.); 5,240,224 (Adams); 5,407,182 (Hartley); 5,337,534 (Nasca); 7,103,984 (Kastberg); 4,932,818 (Garwood); (6,922,968 (Behlen), 5,388,804 (Cohen); 3,150,429 (Shaffer); 3,552,734 (Severino).

Issues include the cost of the devices; the difficulty involved in using some of the prior art devices, especially as that relates to time and labor costs, but also in terms of creating the greatest accuracy of placement and retention of the anchor bolts with the greatest ease. Another issue is the protection of the exposed bolt threads from being fouled by cement.

For greatest cost effectiveness, an important factor in any construction project, an anchor bolt holder would preferably be reusable, easily affixed and removed and capable of holding the anchor bolt in the selected position at the selected top end elevation while protecting the threads of the anchor bolt from being fouled by cement during pouring; then, the bolt holder device would be of an easily removable nature, allowing a finishing of the partially cured cement of the stem wall, and easily prepared for a reuse with a minimal cleanup effort.

Another desirable feature would be for the anchor bolt holder to afford a manner of visually situating and keeping the tops of the paired form boards at the appropriate separation from each other. Another feature would be a design that allows placement of the external form bracing stakes at a point coincident with the lateral ends of an anchor bolt holder device without interference from the bolt holders, thus providing a reduction of the number of elements projecting above the form boards and making the pouring, settling and finishing steps easier to perform.

If the design allows of easy removal of the bolt holder while leaving the bracing stakes in place, a hand floating and minor finishing around the top portions of the bolt that project above the concrete is easier to perform.

Statement of the Objectives

Accordingly, it is an objective of this invention to provide an inexpensive, hardy, reusable anchor bolt holder that, once the cement has cured, can easily be removed and prepared for a reuse with a minimal time and effort.

Another object of the invention is to provide an anchor bolt holder that holds an anchor bolt stably in a fixed vertical position and at a fixed distance from a side wall of a stem wall foundation while holding a threaded end of the bolt at a predetermined height above a top surface of the cement, and, does so while protecting the threads from a fouling by a cement material during a pouring and finishing process.

Another object of this invention is to provide an anchor bolt holder that can be used to provide an alignment and holding of a pair of form boards at a separation that will yield a selected width of stem wall, and, does not interfere with a placement of lateral form support bracing being placed at the lateral ends of the bolt holder; and further allowing of a rotational displacement of the holder that allows of a removal of the device from the bolt after an adequate cure level of the cement has occurred so that a fine finishing can be done around a top surface of the stem wall and the bolt projecting above same.

Another object is to provide a holder that is usable for a placement of an anchor bolt when either a nominal 2.times.4 or a nominal 2.times.6 sill plate is being used.

Other objectives, advantages and novel features of the invention will become apparent to those skilled in the art upon examination of the invention and the accompanying drawings.

SUMMARY OF THE INVENTION

The current invention comprises a strap that bridges across and is of a length exactly that of a full top width of a selected stem wall width plus the widths of a pair of form boards being used to form the stem wall. Hence, the present invention distinguishes from the following patents which all involve unilateral form board contact, or, which are free floating and placed on top of an already poured, but still wet cement foundation: Garwood (U.S. Pat. No. 4,932,818), Behlen (U.S. Pat. No. 6,922,968), Cohen (U.S. Pat. No. 5,388,804), Kastner (U.S. Pat. No. 7,103,984), Shaffer (U.S. Pat. No. 3,150,429) and Severino (U.S. Pat. No. 3,552,734.

The following patents, like the current invention comprise a strap shaped base component that bridges across the form boards: Diaz (U.S. Pat. No. 7,487,597), Delgado (U.S. Pat. No. 5,060,346), Hartley (U.S. Pat. No. 5,407,182), Adams (U.S. Pat. No. 5,240,224) and Smith (2006/0016140). None of the cited patents are of an exact length as the width of the stem wall plus the tops of the form boards being used to create the tem wall. Of these, only Hartley provides a design that immediately allows accurate visual placement of the holder onto the tops of the side wall form boards. Hartley teaches a device that uses short downwardly projecting arms to form grasping members that slide down over the form boards, allowing the device to selectively hold the two side walls at either a six inch or an eight inch internal separation width. He also teaches a single hole for support of an anchor bolt at approximately four inches from an end of the device, which would place the bolt hole opening at two and 7/16.inches from the internal aspect of the adjacent side wall regardless of whether a building design calls for a use of a four.inch wide or a six.inch wide sill plate. Hartley fails to teach: 1. a feature protecting the threads of the bolts from being fouled by cement during pouring; 2. he also fails to teach a provision for automatically insuring that the anchor bolt is held at a required minimum depth into the concrete with an adequate level of thread for an engagement of the washer and nut that are to be placed on the anchor bolt threads atop the sill plate for the superstructure; 3. he also fails to provide a means for aligning the anchor bolt more centrally within the width of a 2.times.6 sill plate; 4. his device interferes with placing angulated lateral form support braces to reinforce the side walls against the weight of the cement in the form. The downward projections of Hartley's device would require additional labor for cleaning off accreted cement from the projections once the device is withdrawn from the set concrete.

The present invention teaches a device that can be manufactured to span a selected stem wall top width plus the tops of a pair of forming boards; a conventional foundation stem wall top width, commonly 6.inches will be used as a minimal width for such a conventional foundation stem wall, and will be used as the example here, but the device can be manufactured for any of a mandated width of wider topped stem walls; at any width; the device does not have any projections that temporarily go down into the cement. As with other such devices, a set of pre-established nail holes in the end sections of the device of the current invention serve to anchor the device on top of the form boards. A base section of the device as taught as a preferred embodiment is created at a length such that an alignment of the external walls of the opposed form boards with the associated ends of the base of the device results in an exact 6 inch width of the stem wall cement.

Thus, the ends of a base portion of the device allow for an accurate visual situation of the form boards at a selected internal separation allowing for a selected internal dimension between the internal aspects of the opposed form boards. The preformed nail holes allow for an easy stabilization of the form boards at that selected distance of separation by a placement of a set of form nails that provide an anchoring of the device across and atop the form boards.

An allowance for a selective placement of the anchor bolt for centering in either a 2.times.4 or a 2.times.6 sill plate is provided in a two hole version of the device; alternatively, a single hole variant for either a 2.times.4 or a 2.times.6 sill plate can be used; a short, laterally downward sloping section at the opposed ends of the device provide an allowance for a placement of a pair of angulated lateral form support braces at the ends of the device, thus reducing interference with pouring the cement by reducing the number of locations wherein something projects across the top of the form.

An integral bolt thread protective section of the present invention serves to locate the anchor bolt at the optimal depth with the selected amount of thread being provided for placement of the washer and nut atop the sill plate, and with the thread being fully protected from fouling by cement during pouring.

The portions of the opposed ends of the base section that rest atop the pair of form boards each end in a centrally angulated taper having a short, flat, end section. The short, flat end section allows of the orientation of the ends of the base of the device with the lateral top margins of the form boards. When viewed from above it is seen that the angulated ends of the device allow of a rotation of the body of the device that allows of a rotation of the device around the Anchor bolt and out from beneath any associated brace stakes. This allows of an easy removal of the device from the stem wall top, allowing for a better finishing of the top stem wall surface once an adequate initial set of the concrete occurs.

The device of the current invention requires minimal effort and time for removal and clean up prior to reuse.

Adams (U.S. Pat. No. 5,240,224) does allow attachment across a variety of top widths of support forms, however he does not provide for automatic visual orientation and support of the form boards at a given width of separation without pre measurement or the use of guide strings. He also allows the placement of the anchor bolt at multiple locations relative to side wall of the foundation. He has no provision for thread protection during pouring or for automatic depth situation of the anchor bolt. Also, the process of alignment and placement of the anchor bolt is laborious and time consuming. Clean up for possible reuse would be laborious due to the multiple openings, hinge and clips involved in the device. The device does not allow placement of angulated lateral form support braces at the ends of the device.

Smith (2006/0016140) does allow attachment across a variety of top widths of support forms, however he does not provide for automatic visual orientation and support of the form boards at a given width of separation without referring to indexed lines on the top of the device that indicate which pairs of several sets of holes are to be used to nail the device atop the form boards for specified widths of cement base and alignment of the anchor bolt for a 2.times.4 vs. a 2.time.6 sill plates; this is a complicated system of orientation. The current invention performs the alignment function by simple visual alignment of the ends of the device at the form boards. Smith's device has multiple nail holes that could rest over the framework during cement pouring and would tend to make cleanup for re use laborious and difficult; also, it is assumed that these index lines would become more difficult to read with repeated reuse. The present invention uses only one, easily cleaned hole that would possibly need cleaning prior to re-use of the device. Smith does provide thread protection and automatic situation of the anchor bolt at the optimal vertical location within the cement foundation, but, unlike the present invention, his device does not allow of the placement of angulated lateral form support braces at the ends of the device.

Delgado Jr. (U.S. Pat. No. 5,060,436) discloses a device comprising a flat rectangular base plate capable of spanning across the tops of both form boards. The device provides automatic setting of the anchor bolt at an optimal depth and protection of the threads of the bolt during the cement pour. However, the anchor bolt hole is centrally located in the length of the base plate of the device; so, situating the anchor bolt at the selected distance from a side of the cement foundation requires visually offsetting the base plate until that location is approximated before nailing the base to the foundation form boards; this means that Delgado's device cannot be used to provide positioning and stabilization of the side walls of the forms at an appropriate internal wall distance of separation until after the boards have been positioned and stabilized by external cross braces atop the form walls; the device of the present invention serves to both situate and then, after nails are placed, hold the form tops at the selected separation independently of a need for cross ties on the forms. There are multiple nail holes and a pair of longitudinal mid base slots on either side of the bolt protective upright tube in Delgado's device; the multiple holes and slots would make cleanup for re-use laborious and time consuming, the present invention does not suffer from this problem. The need to offset the base prevents the placement of angulated lateral form support braces at the ends of the device, which placement can be done with respect to the current invention, resulting in the top surface opening of the forms being over crossed by less support and bracing materials.

Diaz (U.S. Pat. No. 7,487,597) provides a device and system using color coded components to indicate the diameter of the anchor bolt being used; the device comprises a flat rectangular base plate capable of spanning across the top width span of a foundation form and being nailed atop the form boards. The base plate has a series of holes located along the center line across the width of the device. These holes allow placement of the anchor bolt for sill plates of differing widths.

A series of nail holes is located along side the row of anchor bolt holes; these multiple holes would lead to a more laborious and time consuming cleanup prior to reuse of the device. A color coded, flexible split sleeve is used to protect the threads and to hold the anchor bolt in position during the pour. The device does allow anchorage across the tops of the form boards, however, unlike the device of the present invention which performs the spacing and retention of the form boards at a determined inter wall separation by simple visual alignment of the ends of the device atop the form boards and without the need for external form top cross braces, Diaz device requires pre fixation of the form boards before it is affixed to them. As taught, at least one end of Diaz device will likely project beyond the edge of one of the form boards, thus preventing the placement of angulated lateral form support braces at the ends of the device, which placement the current invention does allow.

Kastner (U.S. Pat. No. 7,103,984) while not teaching a full spanning of the top of the stem wall, provides for orientation of the Anchor bolt for either a 2×4 or 2×6 sill plate and allows for appropriate depth placement of the Anchor bolt within the stem wall. However, either a special Anchor bolt with depth-stop knobs built onto the vertical shaft, or a separate, threaded tube that screws down onto the top of the Anchor bolt must be used as a depth and thread protection section. Opposed to this, the current invention has both functions integrally provided within the device of the invention. Kastner's 2.times.4 vs. 2.times.6 sill plate orientation means involves rotation of the base of his template to appropriately situate the bolt hole across the width of the stem wall; the inner edge of the form boards are used to align one end of the template such that appropriate bolt placement is guaranteed. With his template system each template/Anchor bolt is inserted into the still wet cement after the cement has been poured, thus creating an interruption in the flow of pouring, vibrating/tamping the wet cement. The current Device is situated in place before the pour and is less likely to be disturbed or tilted by early cement finishing procedures.

BRIEF DESCRIPTION OF THE DRAWINGS

Further objective, advantages and novel features of the invention will be apparent from the following detailed description when taken in conjunction with the accompanying drawings illustrating a preferred embodiment of the invention.

FIG. 2a. Presents a view looking down on the same single bolt hole version of an anchor bolt holder and spacer device seen in FIG. 1a.

FIG. 2b Right figure: Presents a view looking down on a 2.times.6 sill plate situated atop a stem wall and with an anchor bolt, washer and nut in place atop the sill plate.

FIG. 3a. Presents a cross sectional depiction of a two bolt hole variant of an anchor bolt holder/thread protector/form spacer device situated atop a pair of stem wall form boards with an anchor bolt and nut in place within the device; a series of vertical and angulated form board support pegs are also seen.

FIG. 3b. Presents a cross sectional depiction of a one bolt hole variant of an anchor bolt holder/thread protector/form spacer device situated atop a pair of stem wall form boards with an anchor bolt and nut in place within the device; a series of vertical and angulated form board support pegs are also seen.

FIG. 4b. Presents an end view across an anchor bolt holder and spacer device with character numbering to coincide with that of the Footed Base variant seen in FIG. 4a.

DETAILED DESCRIPTION OF A PREFERRED EMBODIMENT

Figure 1A:
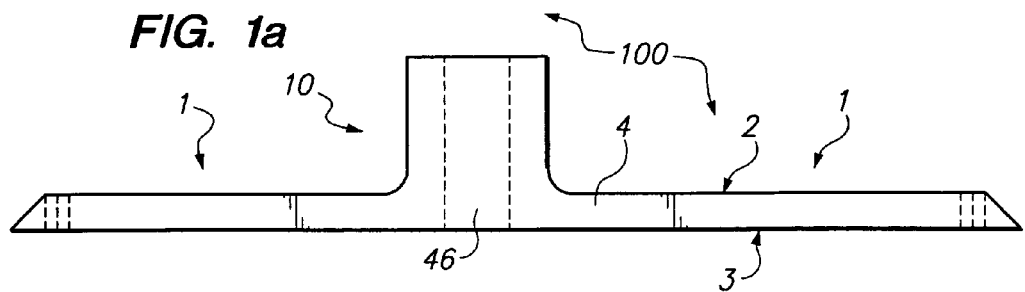
FIG. 1a. Presents a lateral cross sectional view along a central longitudinal axis of a single bolt hole version of an anchor bolt holder and spacer device showing a variant suitable for a placement of an anchor bolt in a conventional cement stem wall footing.
Figure 1B:
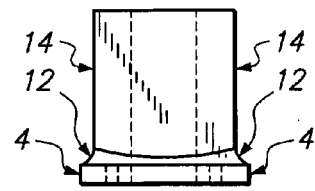
FIG. 1b. Presents an end view across a full width of an anchor bolt holder and spacer device such as is depicted in FIGS. 1a and 1c.
Figure 1C:
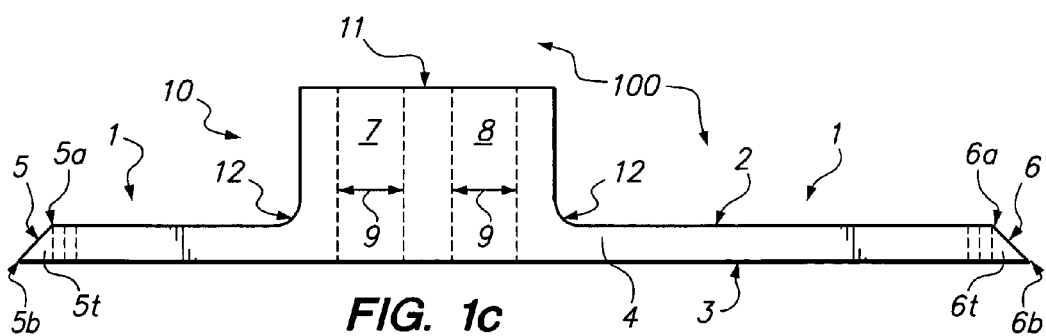
FIG. 1c. Presents a lateral cross sectional view along a central longitudinal axis of a dual bolt hole version of an anchor bolt holder and spacer device of the current invention showing a variant suitable for a placement of an anchor bolt at a location for either a 2.times.4 or a 2.times.6 sill plate on a conventional cement stem wall footing.
Figure 1D:
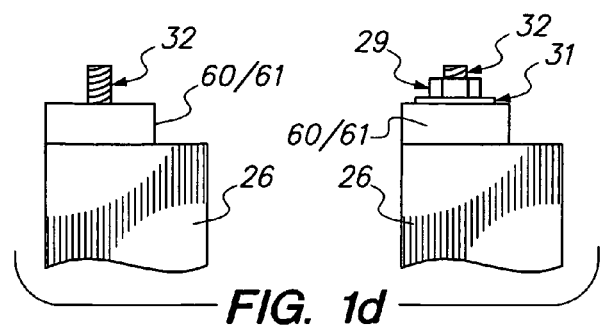
FIG. 1d. Presents a pair of an end views of a finished stem wall foundation with a superimposed sill plate; one view shows a full length of an exposed thread end section above the sill plate and the other view shows a washer and nut on the threaded bolt end.

The improvement, comprises a combination anchor bolt holder, form board internal distance separation alignment and retention, and, thread protection device ("Device") 100 FIG. 1c; said Device comprising in part, at least one vertically oriented bolt hole for a retention of an anchor bolt (aka a J bolt) 200 FIG. 3a/3b, said anchor bolt having a threaded upper end 32 FIG. 1d and a non threaded bottom end 33 FIGS. 3a/5a.

Bolt Holder Function

The Device 100 FIG. 1c further comprises in part a unitary combination of a horizontally aligned base portion 1 FIG. 1c and an essentially vertically oriented body portion 10 FIG. 1*c*; said base portion 1 comprises in part a shorter, horizontally aligned top surface 2 FIG. 1*c* and a longer, bottom surface 3 FIG. 1*c*; said bottom surface partially comprising an outer-most end termination 5*b* FIG. 1*c* and an inner-most end termination 6*b* FIG. 1*c*; said base section 1 further comprising in part a pair of vertically aligned, opposed base section side walls 4 FIGS. 1*c*/1*b*, and a pair of opposed, angulated base section end walls 5,6 FIG. 1*c*; an outer facing end wall 5 FIG. 1*c* and inner facing end wall 6 FIG. 1*c*;

each of said angulated end walls 5/6 FIG. 1*c* respectively comprising in part an upward sloping top surface from a lateral most base end termination 5*b*, 6*b* FIG. 1*c* to a topmost termination 5*a*,6*a* FIG. 1*c*; said angulated inner end and outer end wall top surfaces respectively defining a set of side walls 5*t*,6*t* FIG. 1*c* of said end wall sections 5,6 FIG. 1*c*;

said angulation of said end walls allowing of a placement of a pair of angulated form support brace stakes 500,501 FIG. 3*a*, an outer form brace stake 500 FIG. 3*a* and an opposed inner form brace stake 501 FIG. 3*a*, in a manner with a top end of said angulated brace stakes in an alignment with and projecting above and over said base ends 5,6 FIG. 1*c* of base portion 1 (best seen in FIG. 3*a*); said placement of the brace stakes creating a provision of fewer locations of support projections above said form boards and thus allowing of a less interference with a pouring of a cement and a finishing of a top surface of said stem wall.

Figure 2A:
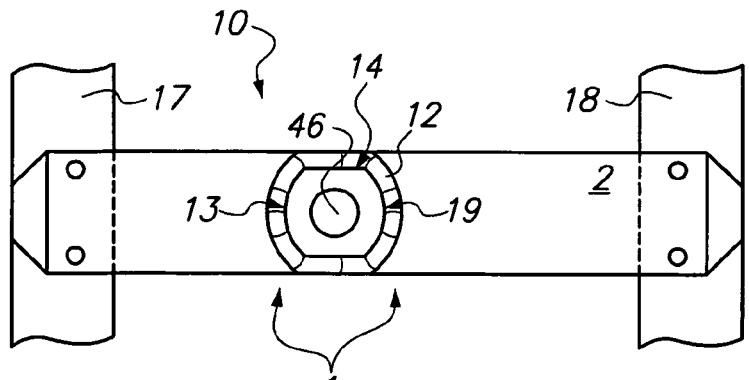
Figure 2B:
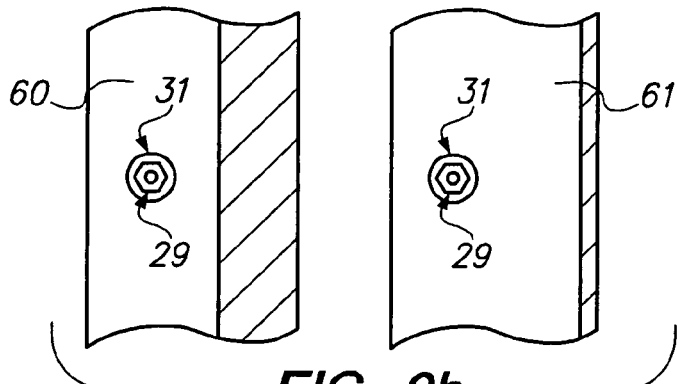
FIG. 2b Left figure: Presents a view looking down on a 2.times.4 sill plate situated atop a stem wall and with an anchor bolt, washer and nut in place atop the sill plate.
Figure 2C:
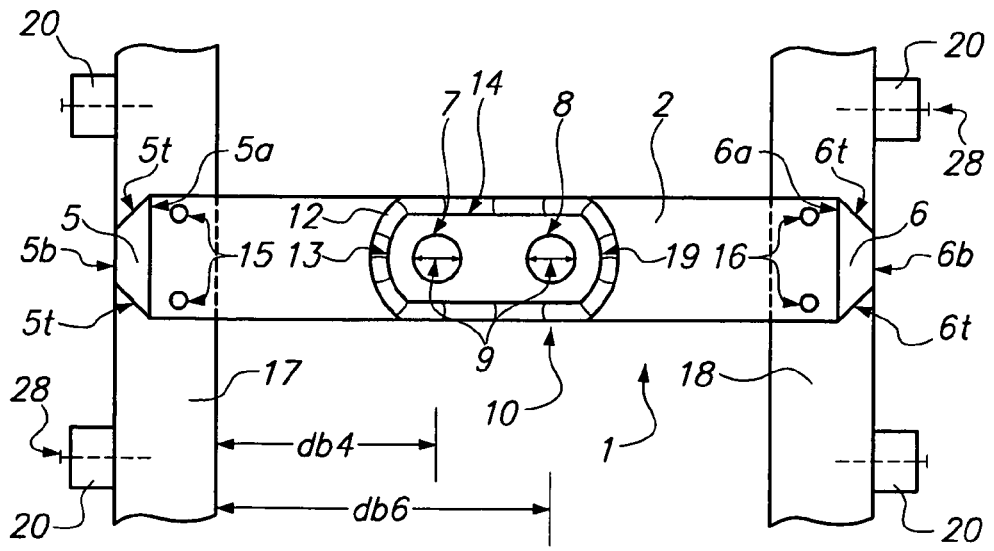
FIG. 2c. Presents a top view looking down on the same dual bolt hole version of an anchor bolt holder and spacer device seen in FIG. 1c.

When viewed from above as in FIG. 2*c*, the outer facing end wall 5 and inner facing end wall 6 are each further characterized by having a trapezoidal peripheral form; outer facing end wall 5 presenting with a shorter, bottom lateral outer end wall termination 5*b* FIG. 2*c* and a longer, topmost termination at a lateral most top surface of the body portion 5*a* FIG. 2*c*; inner facing end wall 6 FIG. 2*c* presenting with a shorter, bottom lateral inner end wall termination 6*b* FIG. 2*c* and a longer, topmost termination, at an inner most lateral top surface of the body portion 6*a* FIG. 2*c*. The trapezoidal shape of outer end wall 5 (best seen in FIG. 2*c*) being brought to a completion by a pair of outer end wall side walls 5*t* FIG. 2*c*, and the trapezoidal shape of inner end wall 6 being brought to a completion by a pair of inner end wall side walls 6*t* FIG. 2*c*.

Base section 1 FIG. 1*c* is surmounted by an integral, vertically oriented and roughly rectangular, upwards projecting body portion 10 FIG. 1*c* of said device; the top surface 2 FIG. 1*c* of the base portion making a smooth, upwards curved connection 12 FIG. 1*b* to a pair of side walls 14 FIG. 1*b* of said upwards projecting body portion, and, as seen in FIG. 2*c*, said smooth upwards curved connection 12 continues in and between the top of said base portion 2 FIG. 2*c* and a curved, laterally facing outer end wall 13 FIG. 2*c* as well as a curved, laterally facing inner end wall 19 FIG. 2*c*; said smoothly upwards curved connection between the base portion and the body portion 10 FIG. 1*c*/FIG. 2*c* of the device serving to provide both a greater structural strength of said device and an enhanced prevention of cement accumulation on said device during a pouring of a cement material 26 FIG. 1*d* within the form boards to form the stem wall foundation.

Base portion 1 FIG. 1*c* in concert with said upwards projecting body portion 10 FIG. 1*c*/FIG. 2*c* is seen being pierced at a 90.degree angle from below to above by a vertically oriented pair of anchor bolt holes 7,8 FIG. 1*c*, an anchor bolt hole 7 FIG. 1*c* in a situation in a location for a placement of an anchor bolt for a nominal 2×4 (1.5"×3.5") sill plate 60 FIG. 2*b*, and an anchor bolt hole 8 FIG. 1*c* in a situation in a location for a placement of an anchor bolt for a nominal 2×6 (1.5"×5.5") sill plate 61 FIG. 2*b*; said pair of anchor bolt holes allowing for a user to selectively use the same device 100 FIG. 1*c* for a placement of a stem wall Anchor bolt for a use with either a nominal 2×4 or a nominal 2×6 sill plate; said bolt hole situation for a 2×4 sill plate comprising an approximate distance of 1.75 inches from an internal aspect of a lateral most stem wall form board db4 FIG. 2*c* and said bolt hole situation for a 2×6 sill plate comprising an approximate distance of 2.75 inches from an internal aspect of a lateral most stem wall form board db6 FIG. 2*c*;

each of said bolt holes having a diameter 9 FIG. 1*c* of a size for a passage of an anchor bolt 10 FIG. 3*a*, which said anchor bolt can thus make a passage upwards from below through said base portion, and, continuing upwards also make a passage through a selected one of that pair of anchor bolt holes 7,8 FIG. 1*c* located in the upwards projecting body portion 10 FIG. 1*c*, said pair of anchor bolt holes coming to an upper termination at a flat, horizontally aligned top-surface 11 FIG. 1*c* of said upwards projecting body portion 10; said pair of bolt holes providing a full and continuous piercing from a top surface of said body portion to a bottom surface of said base portion of said Device;

a pair of form attachment nail holes 15,16 FIG. 2*c* create a passage fully through base section 1 from the top surface 2 through the bottom surface 3; a pair of outer end nail holes 15 FIG. 2*c* being in an alignment such that a nail 21 FIG. 3*a* placed in either of that pair of nail holes is in a central location above a topmost surface of an outer form board 17 FIG. 3*a*; a pair of inner end nail holes 16 FIG. 2*c* being in an alignment such that a nail 21 FIG. 3*a* placed in either of that pair of nail holes is in a central location above a topmost surface of an inner form board 18 FIG. 2*c*.

Figure 4A:
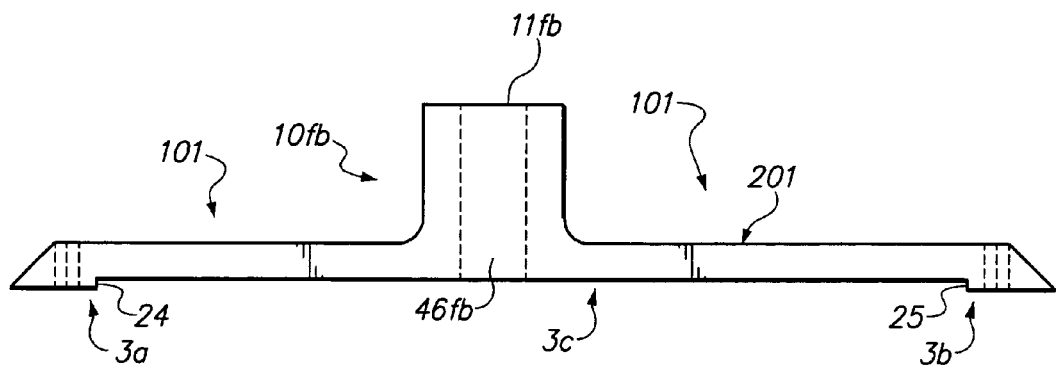
FIG. 4a. Presents a lateral cross sectional view of a Footed Base variant of the device as seen along a central longitudinal axis of a single bolt hole version of an anchor bolt holder and spacer device of the current invention showing a variant suitable for a placement of an anchor bolt in a conventional cement stem wall footing.
Figure 4B:
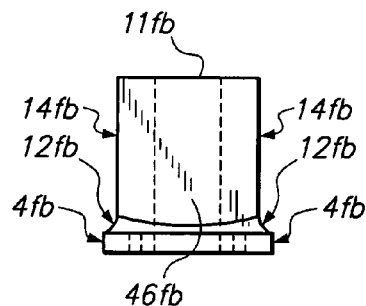
Figure 4C:
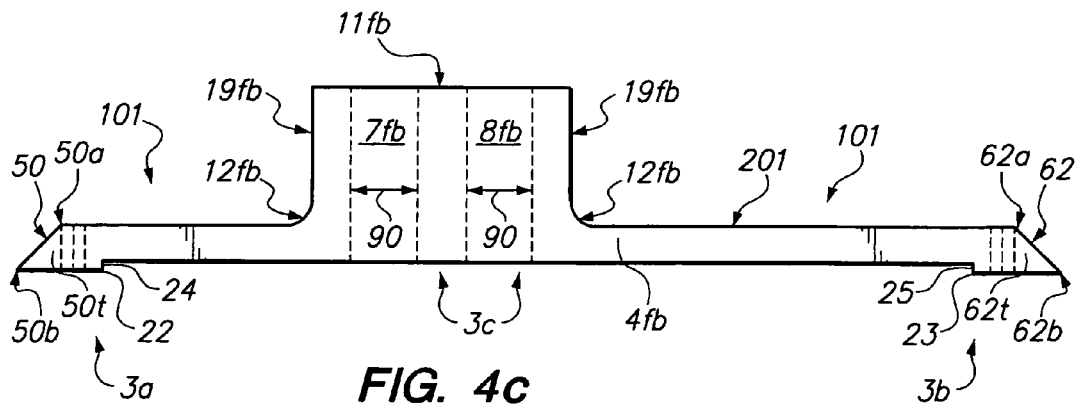
FIG. 4c. Presents a lateral cross sectional view along a central longitudinal axis of a dual bolt hole version of a Footed Base anchor bolt holder and spacer device of the current invention showing a variant suitable for a placement of an anchor bolt at a location for either a 2.times.4 or a 2.times.6 sill plate on a conventional cement stem wall footing.

In a First Alternative Embodiment as depicted in FIG. 1*a*, base portion 1 FIG. 1*a* in concert with said upwards projecting body portion 10 FIG. 1*a* is seen being pierced by a single anchor bolt hole 46 FIG. 1*a*, said anchor bolt hole 46 selectively comprising an anchor bolt hole in a situation for a placement and a usage of an anchor bolt for a nominal 2.times.4 (1.5"×3.5") sill plate 60 FIG. 2*b*, or, alternatively, an anchor bolt hole for a placement and a usage of an anchor bolt for a nominal 2.times.6 (1.5"×5.5") sill plate 61 FIG. 2*b*; a center of said bolt hole situation for a variant selected for a 2.times.4 sill plate comprising an approximate distance of 1.75.inches from an internal aspect of an outer most stem wall form board db4 FIG. 2*c*; in the alternative variant, a center of said bolt hole in a situation for a 2.times.6 sill plate comprising an approximate distance of 2.75 inches from an internal aspect of a lateral most stem wall form board db6 FIG. 2*c*;

In a Second Alternative Embodiment: a Footed-Base Section Embodiment, a footed-base portion 101 FIG. 4*c* which said base portion comprises in part a shorter, horizontally aligned top surface 201 FIG. 4*c* and a parallel, longer, footed-bottom surface 3*a*,3*b*,3*c*. FIG. 4*c*; said footed-bottom surface comprising an outer end foot section 3*a* FIG. 4*c* and an inner end foot section 3*b* FIG. 4*c*; said outer end foot section coming to an outer ending at a lateral-most bottom termination 50*b* FIG. 4*c* and coming to a more central ending, an outer foot internal termination 22 FIG. 4*c*; said inner end foot section 3*b* coming to an inner end foot lateral, bottom termination 62*b* FIG. 4*c* and to a more central ending, an inner foot internal ending 23 FIG. 4*c*; said footed base section 101 FIG. 4*c* further comprising in part an elevated base section 3*c* FIG. 4*c*; said footed base end foot sections 3*a*/3*b* being each of a length of a width of a top surface of a corresponding form board; said outer foot section 3*a* FIG. 4*c* being in a conjoinment with said elevated base section 3*c* FIG. 4*c* of said footed-base section 101 by a short vertical outer foot central end wall 24 FIG. 4*c*; said inner foot section 3*b* of said footed-base section 101 being in a conjoinment with said elevated base section 3c by a short vertical inner foot central end wall 25 FIG. 4c; said elevation of said elevated base section allowing of a hand float entry space 27 FIG. 5a between said base section 3c FIG. 5a and a topmost surface a of a cement stem wall as said topmost cement surface is seen at 30 FIG. 5a; said space 27 allowing of a preliminary hand float finishing of said top cement surface with said Device still in place.

Figure 5A:
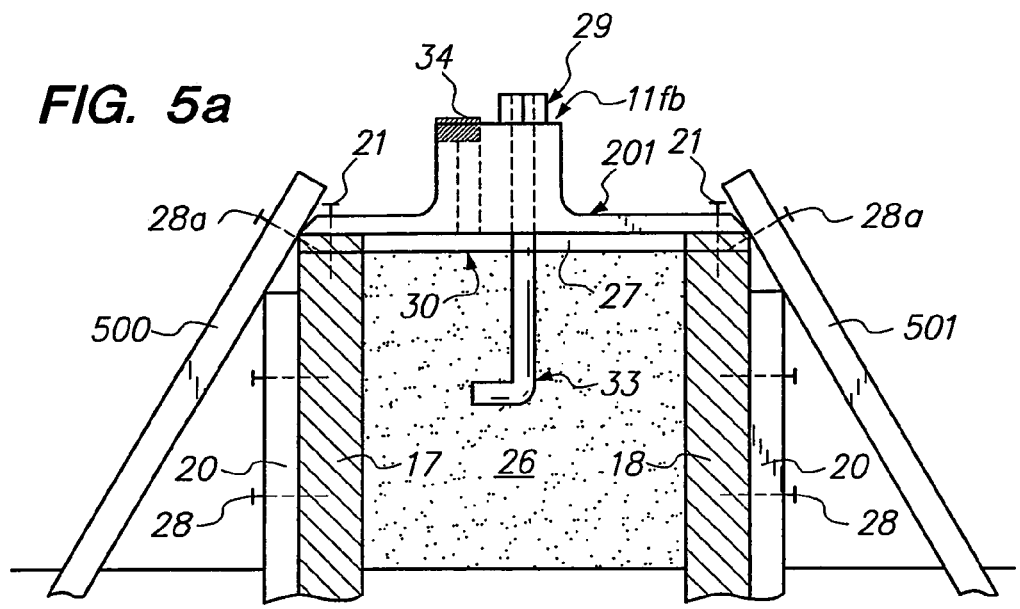
FIG. 5a. Presents a cross sectional depiction of a two bolt hole variant of a Footed Base variant of an anchor bolt holder/thread protector/form spacer device situated atop a pair of stem wall form boards with an anchor bolt and nut in place within the device; a series of vertical and angulated form board support pegs are also seen.
Figure 5B:
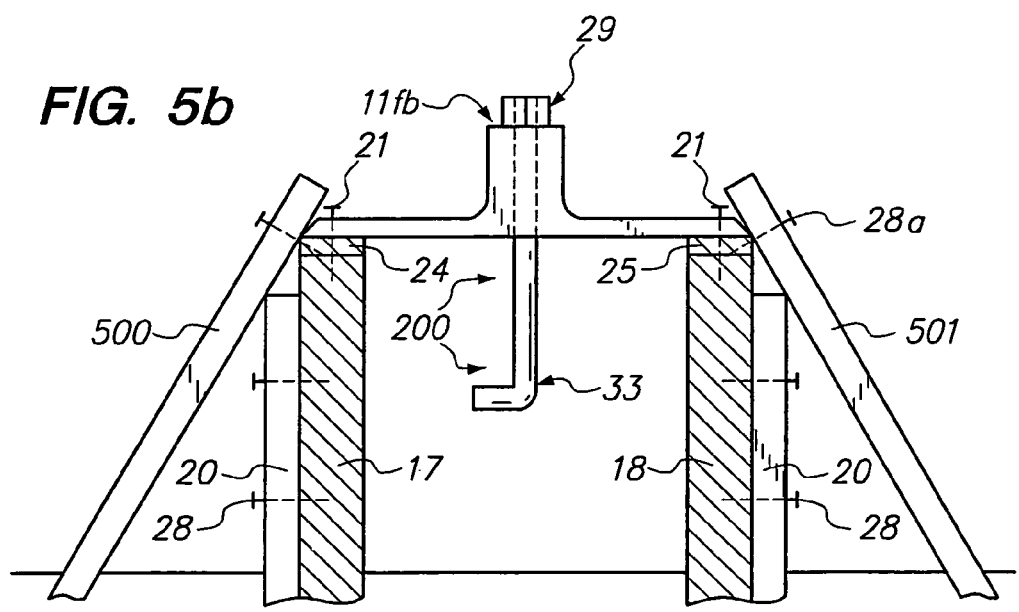
FIG. 5b. Presents a cross sectional depiction of a one bolt hole Footed Base variant of an anchor bolt holder/thread protector/form spacer device situated atop a pair of stem wall form boards with an anchor bolt and nut in place within the device; a series of vertical and angulated form board support pegs are also seen.

Said base section 101 further comprising in part a pair of vertical, opposed base section side walls 4fb FIG. 4b, and a pair of opposed, angulated base section end walls 50,62 FIG. 4c; an outer facing end wall 50 and inner facing end wall 62; each of said end walls, by virtue of a laterally directed inward slope of end wall side walls 50t FIG. 4c and 62t FIG. 4c appear trapezoidal when seen from above (as in 5t FIG. 2c) and further comprise an angulated upward sloping surface from a lateral bottom end 50b and 62b FIG. 4c respectively towards a top most termination 50a and 62a;

said angulation of said end walls allowing of a placement of a pair of angulated form support brace stakes 500,501 FIG. 5a, an outer form brace stake 500 and an opposed inner form brace stake 501, with a top end of said angulated brace stakes in an alignment with and projecting above and over said base ends 50,62 FIG. 4c of base portion 101 (best seen in FIG. 5a); said placement of the brace stakes creating a provision of fewer locations of support projections above said form boards and thus allowing of a less interference with a pouring of a cement and a finishing of a top surface of said stem wall.

Base section 101 FIG. 4c is surmounted by an integral, vertically oriented and roughly rectangular, upwards projecting body portion 10fb FIG. 4c of said device; a top surface 201 FIG. 4c of the base portion making a smooth, upwards curved connection 12fb FIG. 4b to a pair of side walls 14fb FIG. 4b as well as to a pair of end walls 19fb FIG. 4c of said upwards projecting body portion; said smoothly upwards curved connection between the base portion and the body portion of the Device serving to provide both a greater structural strength of said Device and an enhanced prevention of cement accumulation on said device during a pouring of a cement material within the form boards to form the stem wall foundation.

A pair of vertically oriented anchor bolt holes 7fb,8fb FIG. 4c, each having a diameter 90 FIG. 4c for allowing of a passage of an anchor bolt, are seen within said upwards projecting body portion 10fb FIG. 4c, said bolt making a full passage through from a top surface 11fb FIG. 4c down through said body portion 10fb and said elevated base section 3c; an outer most anchor bolt hole 7fb FIG. 4c is seen in a situation for a placement of an anchor bolt for a nominal 2×4 (1.5"×3.5") sill plate 60 FIG. 2b, and an inner most anchor bolt hole 8fb FIG. 4c is seen in a situation for a placement of an anchor bolt for a nominal 2×6 (1.5"×5.5") sill plate 61 FIG. 2b; said pair of anchor bolt holes allowing for a user to selectively use the same Device for a placement of a stem wall Anchor bolt for a use with either a nominal 2×4 or a nominal 2×6 sill plate; said bolt hole situation for a 2×4 sill plate comprising an approximate distance of 1.75 inches from an internal aspect of a lateral most stem wall form board db4 FIG. 2c and said bolt hole situation for a 2×6 sill plate comprising an approximate distance of 2.75 inches from an internal aspect of a lateral most stem wall form board db6 FIG. 1c;

a pair of form attachment nail holes 15,16 FIG. 2c allow a placement of a series of nails 21 FIG. 5a in a central location in a topmost surface of an outer form board 17 FIG. 5a; as well as in a central location in a topmost surface of an inner form board 18 FIG. 5a, In a single anchor bolt hole Alternative Footed-Base Section Embodiment as depicted in FIG. 4a, base portion 101 FIG. 4a in concert with said upwards projecting base portion 10fb FIG. 4a displays with a single anchor bolt hole 46fb FIG. 4a, said anchor bolt hole 46fb selectively comprising an anchor-bolt hole in a situation for a placement of an anchor bolt for a nominal 2×4 (1.5"×3.5") sill plate 60 FIG. 2b, or, alternatively, an anchor bolt hole for a placement of an anchor-bolt for a nominal 2×6 (1.5"×5.5") sill plate 61 FIG. 2b;

a center of said bolt hole situation for a variant selected for a 2×4 sill plate comprising an approximate distance of 1.75 inches from an internal aspect of an outer most stem wall form board db4 FIG. 2c; in the alternative variant, a center of said bolt hole in a situation for a 2×6 sill plate comprising an approximate distance of 2.75 inches from an internal aspect of an outer most stem wall form board db6 FIG. 2c.

In all other respects this single anchor bolt hole footed base variant comprises exactly the same form as does the prior described two anchor bolt hole version, hence the descriptive disclosure for the two anchor bolt hole variant will serve for both variants in those respects.

Form Alignment Function

Base section 1 FIG. 2c outer end wall termination 5b FIG. 2c and inner end wall termination 6b FIG. 2c when placed into an alignment respectively above an external wall aspect of an outer form board 17 FIG. 2c and an inner form board 18 FIG. 2c, create a positioning of the form boards 17 and 18 such that following a placement of a set of four form nails 21 FIG. 3a into the nail holes 15 and 16 FIG. 2c, the form boards will be held in an alignment creating an appropriate internal space shown as db6 FIG. 3a, thus leading to a selected stem wall width.

In an alternative, footed embodiment for either of a single Anchor bolt hole or double Anchor bolt hole model of the device, an accurate alignment of the form boards with a creation of an internal space for creating a selected stem wall width can be also be accomplished by a visual alignment of an internal most bottom edge of a pair of base section vertical components 24 and 25 FIG. 5a respectively with a top edge of an internal aspect of form boards 17 and 18 FIG. 5a respectively; following which a placement of nails 21 FIG. 5a through holes 15 and 16 FIG. 2c will lead to a retention of the form boards at a selected 6.inch distance of internal separation.

A stem wall foundation can be constructed with a bottom surface of the stem wall being in a flush relationship with a top level of the surrounding soil and a pair of side walls fully above soil grade; or, constructed with a bottom surface and some portion of the side walls enclosed within a trench, and a portion of the side walls extending above the grade of the surrounding soil;

in either situation, in practice, following a determination of a placement for one or the other of a pair of opposed outer and inner facing form boards 17,18 FIG. 3a, a guide string is used to align a series of form boards in a placement in an end to end manner to create the selected set of form boards; a series of vertical form board support stakes 20 FIG. 3a are then driven into the soil externally to that series of form boards to hold them in a vertical position, the vertical stakes are then nailed into the form boards by a series of nails 28 FIG. 3a.

In the prior art, after establishment of an inner or an outer form board height and alignment, a second guide string was placed in order to establish a correct vertical height and the approximate separation of the opposed series of form boards relative to the established form board wall; next, following an attachment of a series of vertical form board support stakes it was required that a repetitive series of measurements be made and form top cross stabilizations be nailed in place in order to assure a selected top width of the stem wall;

in the instant invention, once an internal or external form board wall is established, the Device itself is used to create a selected stem wall top width between that first form board line and an opposed form board set; after a pair of nails 21 FIG. 3a are driven through a pair of nail holes 15 or 16 FIG. 2c in the base of the Device down into a top surface of the first established form board wall, the boards of an opposed, second form board wall can be visually aligned with an associated end of the Device, and, a pair of nails placed into a pair of nail holes of that end of the Device will assure a maintenance of a selected internal separation between an inner and an outer form board wall;

following which, a series of vertical form board support stakes 20 FIG. 3a is nailed in an affixation to the second form board wall boards to hold that set of form boards in a vertical alignment and at a height above grade equal to a height of the first placed form board wall.

a series of angulated brace stakes 500,501 FIG. 3a that serve as a further support preventing the form wall from spreading under a weight of a poured cement can then be placed and nailed in place by a pair of nails 28a FIG. 3a (only one of which is visible in side view); and, as was mentioned prior, as opposed to many prior art forms of cross top connectors, the device of the current invention allows of a placement of angulated brace stakes in a direct alignment with the inner and outer ends of the base of the device, thus reducing the number of projections over the open top of the form for pouring the stem wall, and leading to an improved ability to screed and hand float a top surface of the cement of the stem wall.

Thread Protection Function

A flat, horizontal top surface 11 FIG. 3a of the upwards projecting body portion of the device is in a situation at a vertical elevation above the top of the stem wall form such that: when a Anchor bolt is passed from below upwards through a selected hole in an embodiment of the device, and then a nut 29 FIG. 1d is affixed onto an upwards projecting threaded end 32 FIG. 1d of the Anchor bolt until such point that an uppermost surface of the nut is in a horizontal planar alignment with a topmost end of the threaded section of the Anchor bolt, a setting down of the now paired nut and Anchor bolt with an undersurface of the nut resting on the flat top surface of the upwards projection of the device provides that: a threaded section of the Anchor bolt, by virtue of a portion of the threads being held within the nut and the rest of the threaded section being held within the Anchor bolt hole, affords a protection for the Anchor bolt threads against a fouling of the threads with a cement being poured into the forms; and further provides that: a provision is created for a situation of a J-section of said anchor bolt at an exact depth within said stem wall as well as leaving an exact length of said threaded end of the Anchor bolt extending upwards above a top level of a stem wall 26 FIG. 1d such that a washer 31 FIG. 1d and a superimposed nut 29 FIG. 1d can be brought down into a firm compression against a top surface of a sill plate 60/61 FIG. 1d and thereby create a firm attachment of that sill plate to the stem wall.

Miscellaneous Considerations

Most anchor bolts are ⅝.inches in diameter, however, in some instances a ½.inch, ¾.inch, ⅞.inch and even 1.inch or larger bolts may be called for. The Device of this invention can be manufactured to create a fit for any of the above sizes of anchor bolts. An appropriate bolt hole diameter for a placement of a ⅝.inch anchor bolt would have an internal diameter of ²³⁄₃₂.inches.

Although a 6.inch selected width of the finished concrete wall has been described as a width of a "conventional" stem wall, in some instances a stem wall width of 8.inch, 10.inch, 12.inch or larger could be called for, and again, the Device of this invention can be manufactured to create a fit across the required width of form board support walls and a selected finished concrete width for any of the above stem wall widths.

A typical selected height of a top of a threaded end of an anchor bolt above a top surface of a finished concrete stem wall is 2⅝.inches, thereby leaving enough room for a placement of a 2.times.4 wood or a 2.times.6 wood plate/sill plate (1½.inches) plus a washer and a nut to be affixed around and on the threads of an anchor bolt. In the presence of a design demand calling for a greater or a lesser height of a top of an anchor bolt above a stem wall top surface, the Device of this invention can be manufactured to provide an exact height above the stem wall needed in a specific application.

An elevated base section 3c FIG. 4c of any footed variant of the Device will typically have a ⅛.inch elevation above a proposed top surface of a cement stem wall; this allows a mason to run either a margin hand float or a spade hand float under a form tie and around an anchor bolt even during a very early post pour period without having to remove the form tie until after a setup of a cement forming a the stem wall.

High Density Polyethylene (HDPe) comprises a most desirable material for a formation of any of the prior described variants of the Device, however a polypropolene material could also be used as could a material selected from the group consisting of Nylon, Acetal, PEI, PPO, Polyurethanes, and Polycarbonates.

Functional Application Considerations

When using a two bolt hole version of either any flat based or footed base variants of the Device, once a selection is made of a use of a bolt hole for either of a 2.times.4 or a 2.times.6 sill plate, a piece of tape 34 FIGS. 3a & 5a respectively may be placed over a remaining bolt hole that is not be used at that time.

As mentioned prior, the Device is nailed atop the inner and outer form boards with inner and outer ends of the base of the Device aligned with the top lateral most aspects of the inner and outer form boards. Once the form board upright support and angulated brace supports are in place, the cement can be poured between the form boards. Following tamping or vibrational impacts to settle the cement in the forms, the top of the cement will typically be slightly higher or lower than the tops of the form boards. Some form of screeding and floating of the top surface will be done to level the cement and make a smoother finishing surface. A major advantage of the Device as taught in this invention is that in a footed variant, a hand float can be used to level and smooth the cement under the device. Also, in this case in either a flat base variant or a footed base variant having an elevated central base section, after an initial set has been reached but while the top surface is still plastically workable, after a removal of the washer and nut at the top thread area of the Device, the trapezoidal ends of the base section of the Device allow a rotation of the base from a position athwart the stem wall to a position somewhere along the long axis of the stem wall and the Device can be lifted off the bolt, and, a final hand float and edge tool finishing can be accomplished much more effectively.

What is claimed is:

1. The invention, a reusable device comprising a combination anchor bolt holder/thread protection/form alignment device allows of a positioning of a threaded anchor bolt at a selected cross width location within a concrete stem wall foundation with a provision for a situation of an exact length of a projection of said anchor bolt above a top surface of said stem wall as well as providing that said anchor bolt is held in an appropriate position vertically within said stem wall, and with a threaded section of said anchor bolt being protected from a fouling with a cement material during a pouring of a cement in a creation of said stem wall; said device further providing for an accurate visual alignment of and maintenance of an appropriate distance between an opposed inner aspect of a pair of form boards, an inner most form board and an outer most form board, which said inner aspects of said form boards serve to provide a definition of a pair of opposed, lateral aspects of said stem wall; said device comprising in part, a unitary combination of a horizontally aligned base portion and an essentially vertically oriented body portion;

said base portion comprising in part a horizontally aligned, shorter, top surface, a longer bottom surface, a pair of vertically aligned, opposed side walls, and a pair of opposed end walls; said bottom surface being of a length such that when an outer end wall termination and an inner end wall termination of said bottom section are placed in an alignment respectively above an external wall aspect of an outer form board and an external wall aspect of an inner form board, said length of said bottom section creates a separational positioning of said form boards such that said form boards will be held in an alignment creating an appropriate internal space for a creation of a selected stem wall top width;

each of said end wall sections of said base section comprising in part an angulated top surface which said angulated top surface extends from a lateral most base section termination upwards to a more centrally located junction superiorly with said top surface of said base portion; each of said end wall base section terminal endings being of a shorter length than their said superior terminations at said top surface of said base section, such that when viewed from above, each of said end wall sections presents with a trapezoidal form having a shorter base at said lateral most termination and a longer base superiorly at said topmost junction with said top surface of said base section;

said base section being pierced at a 90.degree angle from below to above by at least one vertically oriented hole having an internal diameter of a size for a passage of an anchor bolt, which said anchor bolt can thus make a passage upwards from below through said base section, and, continuing upwards also make a passage through a like placed and sized hole in said integral, essentially vertically oriented body portion of said device; said anchor bolt hole coming to an upper termination at a flat, horizontally aligned top-surface of said body portion; said at least one bolt hole thus providing a full piercing in a continuous manner from a top to a bottom surface of said device;

a combined height of said base and said body portions providing that a portion of said threads being held within said at least one hole of said body portion with the remainder of said threaded section being held with a terminal thread end of said anchor bolt within a nut affixed there-around with a topmost surface of said nut and a topmost surface of said thread end of said anchor bolt being in a flush alignment, creates a provision for a situation of a bottom end section of said anchor bolt at an exact depth within said stem wall, and said affixation of said nut around said thread end of said anchor bolt further providing a protection of said threads from a fouling by a cement material during a pouring of said stem wall; and, said combined height of said base and said body portions of said device further providing that following a removal of said device after a full set of said stem wall cement, an appropriate length of said anchor bolt will be in a projection above a top surface of said stem wall such that a sill plate with a series of properly positioned, pre-drilled holes, once placed atop said stem wall with said sill plate holes in a situation around said anchor bolt thread ends can be brought into a solid affixation with said stem wall by an application and tightening of a series of anchor bolt washers and said anchor bolt nuts;

a length of said bottom surface of said base of said device comprising a length such that a positioning and affixation of an outer most end of said base in a vertical alignment with a lateral most edge of a top of said outer most form board, in combination with a placement of an inner most end of said base in a vertical alignment with a lateral most edge of a top surface of said inner most form board will allow of an exact determination of a selected separation of said pair of opposed internal aspects of said pair of form boards that leads to a creation of a selected lateral width of said stem wall;

said base portion of said device further partially comprising a set of two pairs of vertically situated nail holes, a pair of nail holes at both opposed ends of said base plate section being in a situation above a central aspect of a top surface of said form boards following said vertical alignment of said ends of said base section with said top surfaces of said lateral most edges of said form boards;

said nail holes being of a size appropriate for a receipt of a series of form nails which said series of nails following a placement into said nail holes can be driven by hammer or other suitable driving force into a top surface of said pair of form boards in such a manner that an anchoring of said base section of said device to said form boards is thus afforded with said alignment providing for an exact separation of said form boards at a selected width of said stem wall;

said angulated sections of an outer most end and an inner most end of said bottom surface of said base section providing an allowance that, after an initial set of said cement, and, a removal of said nut from said threaded end of said anchor bolt, said base section can be moved in a rotational manner around said anchor bolt, thus allowing a re-situation of said base such that said ends of said base are removed from said position over said form boards and a lifting of said device is allowed even in the presence of a pair of anchor braces that by virtue of their placement at said ends of said base section might otherwise prevent said removal of said device, said removal of said device providing thus an ability to perform a final finishing of said top surface of said stem wall to a greater degree than would otherwise be possible.

2. The Device of claim 1 in which said bottom surface of said base section comprises a surface fully parallel with said top surface of said Device.

3. The Device of claim 1 in which said bottom surface of said base section comprises a footed base section, which said footed base section comprises in part an outer end foot section and an inner end foot section; each of said foot sections being of a length equal to a top width respectively of said outer most and said inner most form boards; said foot sections being conjoined to and being of a greater vertical height than is a vertical height of an elevated base section of the Device, which said elevated base section, by virtue of said elevation makes an allowance of a space above a top surface of a cement poured into said form boards, thus allowing of a hand float finishing beneath said elevated base section without a removal of said Device from said form boards.

4. The Device of claim 2 comprising in part a single vertically situated anchor bolt hole.

5. The Device of claim 2 comprising in part a pair of vertically situated anchor bolt holes.

6. The Device of claim 3 comprising in part a single vertically situated anchor bolt hole.

7. The Device of claim 3 comprising in part a pair of vertically situated anchor bolt holes.

8. A center of said single, vertically situated anchor bolt hole of claim 4 being in a such position that said anchor bolt of said Device is in a location selected for a usage with a 2.times.4 sill plate, said position within said Device comprising an approximate distance of 1.75 inches from an internal aspect of an outer most stem wall form board.

9. A center of said single, vertically situated anchor bolt hole of claim 4 being in a such position that said anchor bolt of said Device is in a location selected for a usage with a 2.times.6 sill plate, said position comprising an approximate distance of 2.75 inches from an internal aspect of a lateral most stem wall form board.

10. A center of an outer most of said pair of anchor bolt holes of claim 5 being in a such position that an anchor bolt placed within said outer most anchor bolt hole is in a location selected for a usage with a 2.times.4 sill plate, said position within said Device comprising an approximate distance of 1.75 inches from an internal aspect of an outer most stem wall form board; and, a center of an inner most anchor bolt hole of said pair of anchor bolt holes is in a such position that an anchor bolt placed within said inner anchor bolt hole of said pair of anchor bolt holes is in a location selected for a usage with a 2.times.6 sill plate, said position comprising an approximate distance of 2.75 inches from an internal aspect of a lateral most stem wall form board.

11. A center of said single, vertically situated anchor bolt hole of claim 6 being in a such position that said anchor bolt of said Device is in a location selected for a usage with a 2.times.4 sill plate, said position within said Device comprising an approximate distance of 1.75 inches from an internal aspect of an outer most stem wall form board.

12. A center of said single, vertically situated anchor bolt hole of claim 6 being in a such position that said anchor bolt of said Device is in a location selected for a usage with a 2.times.6 sill plate, said position comprising an approximate distance of 2.75 inches from an internal aspect of a lateral most stem wall form board.

13. A center of an outer most of said pair of anchor bolt holes of claim 7 being in a such position that an anchor bolt placed within said outer most anchor bolt hole is in a location selected for a usage with a 2.times.4 sill plate, said position within said Device comprising an approximate distance of 1.75 inches from an internal aspect of an outer most stem wall form board; and, a center of an inner most anchor bolt hole of said pair of anchor bolt holes is in a such position that an anchor bolt placed within said inner anchor bolt hole of said pair of anchor bolt holes is in a location selected for a usage with a 2.times.6 sill plate, said position comprising an approximate distance of 2.75 inches from an internal aspect of a lateral most stem wall form board.

* * * * *